United States Patent Office 2,843,518
Patented July 15, 1958

2,843,518

FUNGICIDES AND FUNGICIDAL COMPOSITIONS

Joseph A. Lambrech, Charleston, and William H. Hensley, St. Albans, W. Va., assignors to Union Carbide Corporation, a corporation of New York No Drawing. Application May 25, 1954
Serial No. 432,331

17 Claims. (Cl. 167—22)

This invention relates to new compositions of matter which are the products obtained by the oxidative condensation of the representative reactants ethylenebisdithiocarbamic acid with xanthic acids. The new compounds are broadly useful in the arts but have been found to be particularly useful in the biological field, especially in the field of fungicides. These compounds possess the representative structures

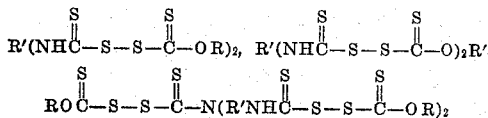

and

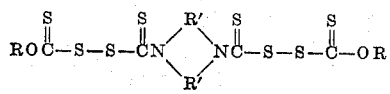

where R' is an alkylene group containing up to 6, inclusive, carbon atoms and R is a cyclic or alkyl group containing up to 8, inclusive, carbon atoms. They may be referred to as S,S'-alkylene- or dialkyl-xanthogen alkylenedithiocarbamates.

Fungicidal compositions containing nitrogen or sulfur have been proposed, for instance the xanthates and the carbamates. A difficulty with the xanthates is that they have shown serious phytotoxic effects thus limiting their use to certain types of plants, sodium isopropylxanthate being marketed as a weed killer. The carbamates are, in practice, used as their metal salts which limits their usefulness because of the deleterious effect of certain metals on various plants.

The compounds contemplated herein are non-metallic, which distinguishes them from a large group of other fungicidal materials and permits their use on crops sensitive to metals, for instance upon apples and other fruit crops which are sensitive to copper, zinc and arsenic compounds. The new compounds also have a wide range of activity; for instance greenhouse and field tests show high activity on rust diseases and foliage diseases of tomato and potato. These tests also show a uniform high level performance without phytotoxicity. In general, the new compounds are superior in fungicidal activity or low phytotoxicity to either the metal alkylenebisdithiocarbamates, the corresponding thiuram disulfides, the alkali metal xanthates and the alkylxanthogen disulfides.

The invention includes the new compounds or compositions of matter as well as the control of fungus diseases by their application to the hosts, particularly in the cases where the hosts are living plants and the active ingredient of the fungicidal composition is one or more of the dialkylxanthogen alkylenebisdithiocarbamates. The new compounds may be used in conjunction with other fungicidal agents and with insecticidal agents; and they may be formulated with inert materials and applied as dusts or as aqueous suspensions. The invention thus includes compositions containing these new compounds and to such practical, effective and low cost compositions as may be used effectively on desirable plant life to prevent the growth of parasitic fungi and yet not have a deleterious effect upon the host, particularly a host in foliage. The invention is also concerned with preparing and placing in the hands of the ultimate user, at a low cost, a fungicidal base material or concentrate which may be used for foliage treatment or from which the user may easily and quickly prepare an efficient water-base or dust fungicide of low phytotoxicity containing the contemplated toxicants as the active ingredient, and with the spray or dust material thus prepared.

The compounds contemplated herein may be obtained by a careful oxidation of an aqueous mixture of an alkylenebisdithiocarbamic acid and an alkylxanthic acid, conveniently and preferably in the form of their water soluble salts. Typical oxidizing agents include oxygen, hydrogen peroxide, ammonium persulfate, peracetic acid, air, salts of hypochlorous acid, chlorine and iodine. The oxidation can be carried out between the temperatures of 0° C. to 50° C. Below 0° C. the reaction rate is too slow to be practical and temperatures above 50° C. tend to bring about the decomposition of the bisdithiocarbamic acids and the xanthic acids. We prefer to carry out the reaction at temperatures between 5° C. and 20° C. This reaction can be conducted in other inert solvents such as carbon tetrachloride, hexane and gasoline but water is the preferred reaction medium because of its low cost.

Examples of the preparation of representative materials contemplated herein are as follows:

COMPOUND NO. 1

*Example 1.—S,S'-dimethylxanthogen ethylenebisdithiocarbamate*

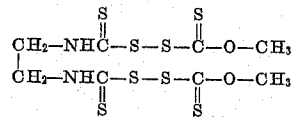

In the preparation of this material sixty-four grams of disodium ethylenebisdithiocarbamate and 65 grams of sodium methylxanthate were dissolved in 300 cc. of water. After cooling the above solution to 10° C. a second solution, containing 57 grams of thirty percent hydrogen peroxide, 49 grams of sulfuric acid and 300 cc. of water, was added gradually with stirring. Considerable heat was developed and the solid carbamate was precipitated. External cooling was used to maintain the reaction temperature at 10° C. to 15° C. The solid material was isolated by filtration, washed with approximately one liter of water and air dried. It was a light yellow powder, insoluble in water, about 15 percent soluble in acetone and had a melting point of 78° C. to 80° C.

COMPOUND NO. 2

*Example 2.—S,S'-diethylxanthogen ethylenebisdithiocarbamate*

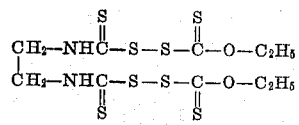

In the preparation of this material potassium ethylxanthate was prepared by adding 77 grams of carbon disulfide to a solution containing 276 grams of ethanol and 66 grams of 85 percent potassium hydroxide. This reaction product was mixed with 248 cc. of water and 128 grams of disodium ethylenebisdithiocarbamate to make a clear solution. After cooling the above solution to 10° C. a second solution, containing 75 grams of chlorine and 1300 cc. of carbon tetrachloride, was added gradually with stirring. Considerable heat was developed and the solid carbamate precipitated. External cooling was used to maintain the reaction temperature at 10° C. to 15° C. The solid product was isolated by filtration, washed with approximately one liter of water and air dried. It was a light yellow powder, insoluble in water and had a melting point of 165° C. to 170° C.

COMPOUND NO. 3

*Example 3.—S,S'-diisopropylxanthogen ethylenebisdithiocarbamate*

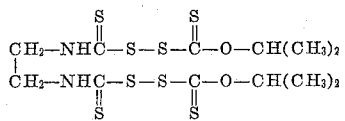

In the preparation of this material potassium isopropylxanthate was prepared by adding 77 grams of carbon disulfide to a solution containing 300 grams of isopropanol and 66 grams of 85 percent potassium hydroxide. This reaction product was mixed with 248 cc. of water and 128 grams of disodium ethylenebisdithiocarbamate to make a clear solution. After cooling the above solution to 10° C. a second solution, containing 86 grams of chlorine and 1000 cc. of carbon tetrachloride, was added gradually with stirring. Considerable heat was developed and the solid carbamate precipitated. External cooling was used to maintain the reaction temperature at 10° C. to 15° C. The solid product was isolated by filtration, washed with approximately one liter of water and air dried. It was a light yellow powder, insoluble in water and had a melting point of 96° C.

COMPOUND NO. 4

*Example 4.—S,S'-dibutylxanthogen ethylenebisdithiocarbamate*

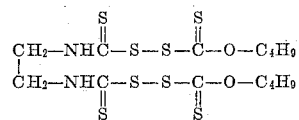

In the preparation of this material potassium n-butylxanthate was prepared by adding 77 grams of carbon disulfide to a solution containing 370 grams of n-butanol and 66 grams of 85 percent potassium hydroxide. This reaction product was mixed with 248 cc. of water and 128 grams of disodium ethylenebisdithiocarbamate to make a clear solution. After cooling the above solution to 10° C. a second solution containing 93 grams of chlorine and 1000 cc. carbon tetrachloride, was added gradually with stirring. Considerable heat was developed and the solid carbamate precipitated. External cooling was used to maintain the reaction temperature at 10° C. to 15° C. The solid product was isolated by filtration, washed with approximately one liter of water and air dried. It was a light yellow powder, insoluble in water and had a melting point of 105° C.

In similar manners the following compounds may be prepared using the appropriate reactants in molar proportions corresponding to those used in the foregoing examples.

NO. 5

*S,S'-dimethylxanthogen propylene-1,2-bisthiocarbamate; M. P. 70° C.*

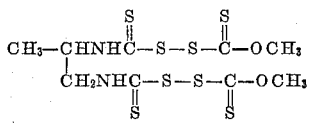

NO. 6

*S,S'-dimethylxanthogen hexamethylenebisdithiocarbamate; M. P. 106–109° C.*

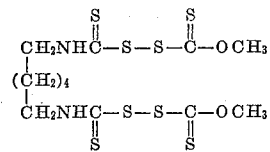

NO. 7

*S,S',S''-trimethylxanthogen diethylenetrisdithiocarbamate; M. P. 131° C.*

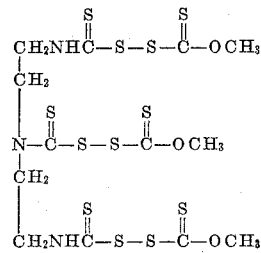

NO. 8

*S,S'-dimethylxanthogen-1,4-piperazinyl-1,4-bisdithiocarbamate; M. P. 134° C.*

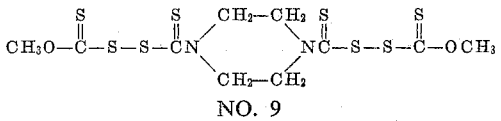

NO. 9

*S,S'-dicyclohexylxanthogen ethylenebisdithiocarbamate; M. P. >280° C.*

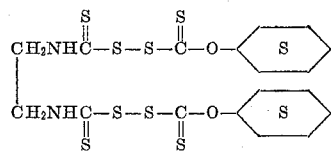

NO. 10

*S,S'-2-ethylhexylxanthogen ethylenebisdithiocarbamate; M. P. 80–84° C.*

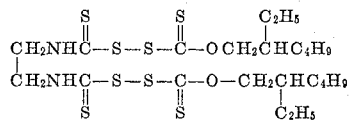

NO. 11

*S,S' - ethylenebisxanthogen ethylenebisdithiocarbamate and polymeric reaction products of an ethylenebisxanthate and an ethylene bisdithiocarbamate; M. P. 85–130° C.*

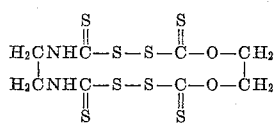

or, more generally,

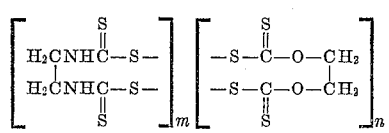

where "$m$" and "$n$," respectively, is 0 or an integer and the sum of "$m$"+"$n$" is at least 2. In this compound the range in melting point indicates that the final product contains polymeric material in which xanthate residues have combined or carbamate residues have combined or one or more xanthate residues have combined with one or more carbamate residues.

This material was prepared by mixing one mole of disodium ethylenebisxanthate and one mole of disodium ethylenebisdithiocarbamate in 500 cc. water and 400 cc. carbon tetrachloride and oxidizing at 0–5° C. using chlorine as an oxidizing agent. The chlorine was added as a gas until 72 grams reacted. Considerable heat developed and the solid product precipitated. External cooling was used to maintain the above reaction temperature. The solid product was isolated by filtration, washed with approximately one liter of water and then air dried. It was a light yellow powder, insoluble in water and had a melting range of 85° C.–130° C.

Compounds Nos. 1 to 6, inclusive, 9, 10 and 11 are preferred because they are readily produced from low cost reactants.

In general these compounds are of the formula $$\begin{array}{c} R'\diagup\mathrm{NH\overset{S}{\overset{\|}{C}}-S-S-\overset{S}{\overset{\|}{C}}-OR} \\ \diagdown\mathrm{NH\overset{S}{\overset{\|}{C}}-S-S-\overset{S}{\overset{\|}{C}}-OR} \end{array}$$

(Nos. 1 to 6 inclusive, 9, and 10)

or $$\begin{array}{c} R'-\mathrm{NH\overset{S}{\overset{\|}{C}}-S-S-\overset{S}{\overset{\|}{C}}OR} \\ |\\ \mathrm{N-\overset{S}{\overset{\|}{C}}-S-S-\overset{S}{\overset{\|}{C}}-OR} \\ |\\ R'-\mathrm{NH\overset{S}{\overset{\|}{C}}-S-S-\overset{S}{\overset{\|}{C}}-OR} \end{array}$$

(No. 7)

$$\mathrm{RO\overset{S}{\overset{\|}{C}}-S-S-\overset{S}{\overset{\|}{C}}N}\diagup^{R'}\diagdown\mathrm{N\overset{S}{\overset{\|}{C}}-S-S-\overset{S}{\overset{\|}{C}}-OR}$$

(No. 8)

$$\left[\begin{array}{c}\mathrm{NH\overset{S}{\overset{\|}{C}}-S-}\\ R'\diagup\\ \diagdown\mathrm{NH\overset{S}{\overset{\|}{C}}-S-}\end{array}\right]_m \left[\begin{array}{c}\mathrm{-S-\overset{S}{\overset{\|}{C}}-O}\\ \diagdown R'\\ \mathrm{-S-\overset{S}{\overset{\|}{C}}-O}\diagup\end{array}\right]_n$$

(No. 11)

where R' is an alkylene group containing up to 6 inclusive, carbon atoms; and R is a cyclic group for example phenyl or cyclohexyl or higher homolog or an alkyl group, containing from 1 to 8, inclusive, carbon atoms; and "m" and "n" respectively, is 0 or an integer and the sum of "m" and "n" is at least 2.

For comparative purposes in biological tests, the following compounds were prepared.

NO. A

*1,2-dithia-4,7-diazacyclooctane-3,8-dithione*

$$\begin{array}{c}\mathrm{CH_2NH\overset{S}{\overset{\|}{C}}-S}\\ |\qquad\qquad|\\ \mathrm{CH_2NH\overset{}{\underset{\|}{C}}-S}\\ \mathrm{S}\end{array}$$

This is the oxidation product of disodium ethylenebisdithiocarbamate, a reactant used in the preparation of compound No. 1. Compound No. A has a melting point of 174° C. to 180° C. and is insoluble in acetone.

NO. B

*Dimethylxanthogendisulfide*

$$\mathrm{CH_3-O-\overset{S}{\overset{\|}{C}}-S-S-\overset{S}{\overset{\|}{C}}-OCH_3}$$

This is the oxidation product of sodium methylxanthate,
the other reactant used in the preparation of compound No. 1. Compound No. B is a liquid.

NO. C

*Potassium methylxanthate*

$$\mathrm{KS-\overset{S}{\overset{\|}{C}}-OCH_3}$$

This compound is water soluble and may replace the corresponding sodium salt in the preparation of compounds Nos. 1, 5, 6, 7 and 8.

*Biological tests—Greenhouse tests—Percent disease tests*

*Tomato foilage disease tests.*—Greenhouse tests were run on compound No. 1 and compounds Nos. B and C for the control of early blight and late blight on tomatoes. The object of these tests was to determine the efficacy of the compounds in preventing attack upon the tomato plant by the fungus *Alternaria solani* which causes a disease commonly called early blight and by the fungus *Phytophthora infestans* which commonly causes a disease known as late blight. Both of these diseases also occur on potatoes, the late blight being particularly destructive on potatoes in most of the areas where this crop is grown. The early blight disease is more commonly found on tomatoes and is frequently very destructive. Because the tomato plant is more easily and quickly grown under greenhouse conditions than the potato, it was chosen for these tests.

For the tests on the blights aqueous suspensions were prepared containing 0.4 part (all parts by weight), .008 part, .0016 part and .00032 part of compound No. 1 in 100 parts of water. Aqueous suspensions were also prepared containing .04 part and .008 part of compounds Nos. B and C. The suspensions also contained .01 part of dispersing agent, in this case an alkyl phenyl polyethylene glycol ether, marketed under the proprietary mark "Tergitol" dispersant NPX, per 100 parts of water. Individual tomato plants were sprayed for 30 seconds with one or another of the suspensions thus prepared during which time the plants were thoroughly wetted. Check or control plants were similarly sprayed with water containing none of the compounds. As soon as the spray dried (usually about 2 hours after application) plants sprayed with each of the suspensions and control plants were inoculated with the spores of either *Alternaria solani* or *Phytophthora infestans*. All of the plants, including the control plants which received no fungicidal spray, were then subjected to 100 percent humidity in closed chambers maintained at approximately 72° F. in the case of early blight and 62° F. in the case of late blight, these being the optimum temperatures for the development of the respective diseases. The plants were held in the chambers for about 24 hours to allow infection to take place and were then removed to a greenhouse where disease readings were taken about three days later. The figures on the following Table 1 under the heading Tomato Foilage Disease Tests, sub-headings EB and LB represent the percent lesions on the leaves of the plants sprayed with the compounds considering the number of lesions on the control plants as 100 percent. Each figure is the average of the results of at least two such tests.

The method of test is more fully explained in an article by McCallan and Wellman appearing in Contributions Boyce Thompson Institute, volume 13, pp. 93–134, 1943.

*Snap dragon rust test.*—This test was conducted in the same way that the Tomato Foilage Disease Test was conducted, except that growing snapdragon plants (*Antirrhinum majus*) were used and spores of *Puccinia antirrhini* were used to inoculate the plants. The results of a number of tests conducted in a uniform fashion are shown under the heading "Snap Rust" in Table 1. Results are expressed as the percent disease resulting when snapdragon plants were sprayed with aqueous sprays containing the compounds at the concentrations in weight percent shown under the heading "Snap Rust," based on the amount of disease on the control plants as 100 percent. This test method is more fully described in an article by S. E. McCallan appearing in Contributions Boyce Thompson Institute, volume 13, pages 367–383, 1944.

4 Moderately severe.
5 Very severe—shoot dying.

No phytotoxic effects were noted from the above chemicals.

D is manganese ethylenebisdithiocarbamate.
E is zinc ethylenebisdithiocarbamate.

TABLE 1.—FOLIAGE DISEASE TESTS

| Compound No. | Tomato | | | | | | | | Snap Rust | | |
|---|---|---|---|---|---|---|---|---|---|---|---|
| | E. B. | | | | L. B. | | | | | | |
| | .04 | .008 | .0016 | .00032 | .04 | .008 | .0016 | .00032 | .008 | .0016 | .00032 |
| 1 | 1 | 3 | 24 | 39 | 0 | 2 | 15 | 28 | 1 | 4 | 25 |
| B | 9c | 24 | | | 45b+ | 96 | | | 74 | | |
| C | 21b | 23 | | | c 83 | | | | 66 | | |

The ratings "b" and "c" indicate, respectively, slight and moderate phytotoxicity.

In other tomato foilage disease tests, tests were run in the manner previously described on compounds No. 1, No. 2, No. 3, No. 4, No. 5, No. 6, No. 10 and No. 11 for preventing early blight. The results of these tests are given on the following Table 2.

TABLE 2.—TOMATO FOLIAGE DISEASE TESTS

| Compound No. | E. B. | | | |
|---|---|---|---|---|
| | .04 | .008 | .0016 | .00032 |
| 1 | 2 | 2 | 7 | 53 |
| 2 | 0 | 0 | 9 | 23 |
| 3 | 1 | 0 | 5 | 43 |
| 4 | 0 | 0 | 23 | 40 |
| 5 | 1 | 7 | 28 | 47 |
| 6 | 7 | 56 | 72 | 100 |
| 10 | 4 | 7 | 13 | 83 |
| 11 | 3 | 9 | 26 | 69 |

Field tests.—Potatoes

In making these tests blocks of potato plants (var. Russet) were sprayed at intervals of 6 to 10 days, commencing on July 2. The formulation used was 70 parts by weight of compound No. 1, D, E, or A, 29 parts of "Attaclay" (a proprietary brand of adsorptive, low density clay) used as a solid diluent and conditioner and 1 part of "Tergitol" dispersant XC (a proprietary brand of alkylpolyglycol ether) used as a wetting and dispersing agent. The sprays were aqueous suspensions in the proportion of 1 pound of active ingredient per 100 gallons of water and were applied with a power sprayer at 125 pounds pressure until the plants were thoroughly wetted. On August 17, four days after the sixth spray, individual shoots in each replication were artificially inoculated with the late blight organism. After inoculation the shoots were covered with aluminum foil bags for 24 hours in order to maintain a high humidity which favors development of the disease. Over an inch of rain had fallen in the period between the last spray application and the date of inoculation. When the disease developed, the inoculated shoots were rated as to the severity of the disease, these four ratings being shown on the following Table 3.

TABLE 3

| Compound: | Average disease rating |
|---|---|
| 1 | 0.75 |
| A | 3.00 |
| D | 1.25 |
| E | 3.00 |
| Check—unsprayed | 4.62 |

Ratings:
 0 No disease.
 1 Very slight.
 2 Slight.
 3 Moderate.

In another test on potatoes (var. Katahdin) the potatoes were planted in mid-June and give eight fungicidal sprays during the season. Inoculations of late blight were made once during the season on August 11. The late blight figures are the percent control as compared with the unsprayed check plants which were assigned a disease rating of 100 percent.

TABLE 4.—POTATO TESTS

| Compound | Dosage lbs. per 100 gals. | Late Blight Percent Disease |
|---|---|---|
| 1 | 1 | 3 |
| 1 | 2 | 2 |
| A | 1 | 24 |
| D | 1 | 42 |
| E | 1 | 14 |
| E | 2 | 16 |
| Check-Unsprayed | | 100 |

In another test on potatoes, in Florida, potatoes (var. Bliss Triumph) were planted on October 2. Sprays of aqueous suspensions of the compounds under test were made throughout the growing season on November 3, 10, 13, 18, 23, 27, and December 4, 10, 15. The formulations were 70 parts by weight of active ingredient, 29 parts of "Attaclay" and 1 part of "Tergitol" dispersant NPX. The sprays were applied at the gallonage rates of 140 gallons per acre in the early applications and at 180 gallons per acre in the later applications, at 300 pounds pressure. These sprays were prepared at rates of ½, 1 and 2 pounds of active ingredient per 100 gallons. The potatoes were harvested on December 28. The first late blight lesions were noted on November 10. The vines in the check plots began to break down about November 20. The figures on the following Table 5 indicate the average percent of the foliage of the plants which was diseased on the dates given on the table.

TABLE 5.—PROGRESSIVE SCORING AND YIELDS—AVERAGE PERCENT DISEASE

| Compound | Rate, lb./100 gal. | 11/23 | 11/30 | 12/7 | 12/14 | Pounds Yield |
|---|---|---|---|---|---|---|
| 1 | ½ | 0.7 | 1.7 | 25.0 | 71.2 | 130 |
| 1 | 1 | 0.3 | 2.7 | 9.0 | 30.0 | 164 |
| 1 | 2 | 0.3 | 0.2 | 1.0 | 15.0 | 182 |
| A | ½ | 1.7 | 12.7 | 38.7 | 88.7 | 97 |
| A | 1 | 1.0 | 10.0 | 30.0 | 83.7 | 121 |
| A | 2 | 1.0 | 6.2 | 21.2 | 68.7 | 146 |
| Check-unsprayed | | 10 | 22.5 | 45.0 | 96.2 | 82 |

To facilitate the distribution of the fungicidal compounds disclosed herein, they are preferably applied in conjunction with a diluent or extender. The extender may be either a liquid (usually, and preferably, water) or a powdered solid. For application as dust compositions the compounds may be so admixed with finely divided solid inert materials as to provide homogeneous free-flowing dusts. The usual pulverized inert materials may be used, preferably talcs, natural clays, pyrophollite, diatomaceous earth or cotton seed flour, or other flours. Other inert solid carriers may be magnesium or calcium carbonates, calcium phosphate, sulfur, etc, either in powder or granular form. The percent by weight of the essential active ingredient will vary according to the manner in which the composition is to be applied but, in general, will be from about 0.5 to 95 percent by weight of the dust. The inert carriers may be substituted in whole or in part by other materials which it is desired to apply to the soil for instance fertilizers, soil conditioners, etc.

Liquid fungicidal compositions are preferably applied with water as the extender, the amount of water depending principally upon the convenience of the agriculturist and the type of spraying apparatus which he customarily uses. As indicated on the foregoing tables the sprays may contain as little as ½ pound of active fungicidal compound in 100 or more gallons of water; where the spray is to be applied with a misting machine, the aqueous suspension may contain as much as 2 or more pounds of active fungicidal composition in about 10 gallons of water.

In the case of aqueous sprays it is desired to have the fungicidal compound in homogeneous dispersion and for this purpose a surface-active agent is preferably used. Substantially any wetting, dispersing or penetrating agent may be used whether ionic, cationic or nonionic. The preferred concentrates contain the fungicidal compound with from about 0.1 percent to 15 percent by weight of surface-active agent with sufficient of the fungicidal compound to make 100 parts by weight such compositions then being suitable for admixture with either a solid or a fluid extender. For general use, the weight of surface-active agent will be from about 5 percent to 10 percent of the weight of the active ingredient in the concentrate. Suitable surface-active, wetting or dispersing agents may be, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene carbon monoxide polymers, laurylamine hydrochloride, laurylpyridinium bromide, stearyltrimethylammonium bromide, cetyldimethylbenzyl ammonium chloride, lauryldimethylamine oxide, and the like.

The compounds contemplated herein may be used with or without "addends," for instance insecticides, for instance rotenone, D. D. T. or nicotine sulfate, or those addends which cause the fungicides to adhere evenly and strongly to plant foliage, for instance methyl cellulose, extending materials or diluents, for instance the inert materials previously mentioned, which facilitate the measuring of and the application of the small amounts of active materials which are desirable to inhibit the fungi. Addends such as bentonite are combined extenders and adhesives.

From a practical point of view the manufacturer must supply the agriculturist with a low cost concentrate or spray- or dust-base in such form that merely by mixing with water or talc or other low cost materials readily available to the agriculturist at the point of use, he will have an easily prepared fungicidal spray or dust. For this purpose the compounds contemplated herein may be packaged as wettable powders containing a finely-divided solid extender or filler. In general, the toxicants are preferably packaged as wettable powders containing the proportion of wetting agent previously described, such powders being adapted either for admixture with water to yield an aqueous spray or for use as a dust concentrate or for admixture with powdered solids to yield a more extended dust. Free-flowing, wettable powder concentrates preferably contain from about 20 to 100 parts by weight of an inert material per 100 parts by weight of combined fungicide and wetting agent. The aqueous sprays preferably contain so much of the toxicants that they are in the form of slurries or suspensions comprising undissolved (solid) toxicant as well as a minute amount of dissolved toxicant. When such a spray dries there is not only the toxicant which is deposited from the spray water by the evaporation of the water but also the surplus toxicant which acts as a reserve, ready to dissolve and spread over the plant in case of dew or rain.

Apart from the distinctive fungicidal properties of the materials herein disclosed, adapting them for agricultural use, the compounds generally may be used as modifying agents in the paper and rubber industries, and they may find applications in the pharmaceutical arts either as drugs or intermediates.

What is claimed is:

1. As new compositions of matter, compounds of the formulae $$\begin{array}{c} \text{S} \quad\quad\quad \text{S} \\ \| \quad\quad\quad \| \\ \text{NHC}-\text{S}-\text{S}-\text{C}-\text{OR} \end{array}$$

$$R'\diagdown \text{NHC}-\text{S}-\text{S}-\text{C}-\text{OR}$$

$$R'-\text{NHC}-\text{S}-\text{S}-\text{COR}$$

$$\begin{array}{c} \text{N}-\text{C}-\text{S}-\text{S}-\text{C}-\text{OR} \\ | \\ R'-\text{NHC}-\text{S}-\text{S}-\text{C}-\text{OR} \end{array}$$

$$\text{ROC}-\text{S}-\text{S}-\text{CN} \diagup^{R'} \diagdown \text{NC}-\text{S}-\text{S}-\text{C}-\text{OR}$$

and $$\left[ \begin{array}{c} \text{NHC}-\text{S}- \\ R'\diagup \\ \text{NHC}-\text{S}- \end{array} \right]_m \left[ \begin{array}{c} -\text{S}-\text{C}-\text{O} \\ \diagdown R' \\ -\text{S}-\text{C}-\text{O} \end{array} \right]_n$$

where R is a member of the group consisting of monocyclic and alkyl groups containing from 1 to 8, inclusive, carbon atoms; R' is an alkylene group containing up to 6, inclusive, carbon atoms; and "$m$" and "$n$," respectively, is an integer from 0 to 4, inclusive, and the sum of "$m+n$" is at least 2.

2. A compound of the formula $$\left[ \begin{array}{c} \text{NHC}-\text{S}- \\ R'\diagup \\ \text{NHC}-\text{S}- \end{array} \right]_m \left[ \begin{array}{c} -\text{S}-\text{C}-\text{O} \\ \diagdown R' \\ -\text{S}-\text{C}-\text{O} \end{array} \right]_n$$

where R' is an alkylene group containing up to 6, inclusive, carbon atoms; and "$m$" and "$n$," respectively, is an integer from 0 to 4, inclusive, and the sum of "$m+n$" is at least 2.

3. A fungicidal composition containing from .005 to 50 parts by weight of a compound defined in claim 1 with sufficient added material to make 100 parts by weight.

4. A fungicidal composition for combatting plant pests containing from .005 to 50 parts by weight of a compound as defined in claim 1 with sufficient inert material to make 100 parts by weight.

5. Method of combatting fungi which comprises applying to the host a compound as defined in claim 1 in an amount sufficient to be toxic to the fungi.

6. Method of combatting fungi which comprises applying to the host a composition containing a compound as defined in claim 1 and an extender, the composition containing the compound in an amount sufficient to be toxic to the fungi.

7. A concentrate adapted to be made into a spray for combatting fungi by the addition of water comprising a compound as defined in claim 1 and a dispersing agent in the proportion from about 0.1 part to 15 parts of dispersing agent with sufficient of said compound to make 100 parts by weight.

8. A concentrate adapted to be made into a spray for combatting fungi by the addition of water comprising a compound as defined in claim 1 and a dispersing agent in sufficient solvent to maintain the concentrate in a liquid condition.

9. Method of preparing a compound as defined in claim 1 which comprises reacting in a fluid medium a dithiocarbamate, a xanthate and an oxidizing agent, the dithiocarbamate being a member of the group with the formulae

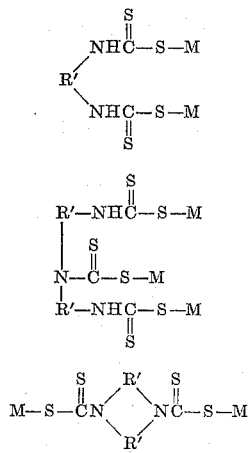

the xanthate being a member of the group of xanthates of the formulae MSSCOR and (MSSCO)$_2$R′ where R′ is an alkylene group containing up to 6, inclusive, carbon atoms; R is a member of the group consisting of cyclic and alkyl groups containing from 1 to 8, inclusive, carbon atoms; M is a basic moiety selected from the group consisting of alkali metals, ammonium and amino.

10. As a new composition of matter, S,S′-dimethyl-xanthogen ethylenebis-dithiocarbamate.

11. As a new composition of matter, S,S′-diethyl-xanthogen ethylenebis-dithiocarbamate.

12. As a new composition of matter, S,S′-diisopropyl-xanthogen ethylenebis-dithiocarbamate.

13. As a new composition of matter, S,S′-dibutyl-xanthogen ethylenebis-dithiocarbamate.

14. As a new composition of matter, S,S′-di-2-ethyl-hexyl-xanthogen ethylenebias-dithiocarbamate.

15. As new compositions of matter, compounds of the formula:

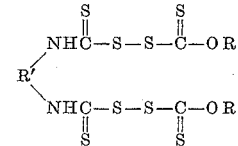

wherein R is a member of the group consisting of monocyclic and alkyl groups containing from 1 to 8, inclusive, carbon atoms and R′ is an alkylene group containing up to 6, inclusive, carbon atoms.

16. As new compositions of matter, compounds of the formula:

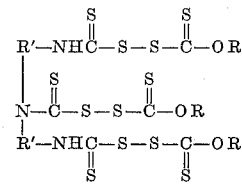

wherein R is a member of the group consisting of monocyclic and alkyl groups containing from 1 to 8, inclusive, carbon atoms and R′ is an alkylene group containing up to 6, inclusive, carbon atoms.

17. As new compositions of matter, compounds of the formula:

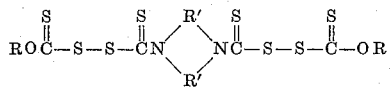

where R is a member of the group consisting of monocyclic and alkyl groups containing from 1 to 8, inclusive, carbon atoms and R′ is an alkylene group containing up to 6, inclusive, carbon atoms.

References Cited in the file of this patent

UNITED STATES PATENTS

| | | |
|---|---|---|
| 2,574,829 | Himel | Nov. 13, 1951 |
| 2,690,440 | Himel | Sept. 28, 1954 |

FOREIGN PATENTS

| | | |
|---|---|---|
| 789,500 | France | Oct. 29, 1935 |

UNITED STATES PATENT OFFICE
CERTIFICATE OF ORRECTION

Patent No. 2,843,518                                                            July 15, 1958

Joseph A. Lambrec et al.

It is hereby certified that error appears in the printed specification of the above numbered patent requiring correction and that the said Letters Patent should read as corrected below.

Column 1, lines 37 and 38, for "akylenedithiocarbamates" read -- alkylenebisdithiocarbamates --; column 3, line 68, for "-bisthiocarbamate", in italics, read -- -bisdithiocarbamate --, in italics; column 6, line 31, for "0.4 part" read -- .04 part --; column 8, line 21, for "give" read -- given --; column 12, line 10, for "ethylenebias" read -- ethylenebis --.

Signed and sealed this 31st day of March 1959.

(SEAL)
Attest:

KARL H. AXLINE
Attesting Officer

ROBERT C. WATSON
                                                          Commissioner of Patents